Jan. 1, 1952     W. M. KIRK     2,581,028
ANIMAL RUBBING AND OILING STATION OR APPARATUS
Filed April 24, 1950     2 SHEETS—SHEET 1
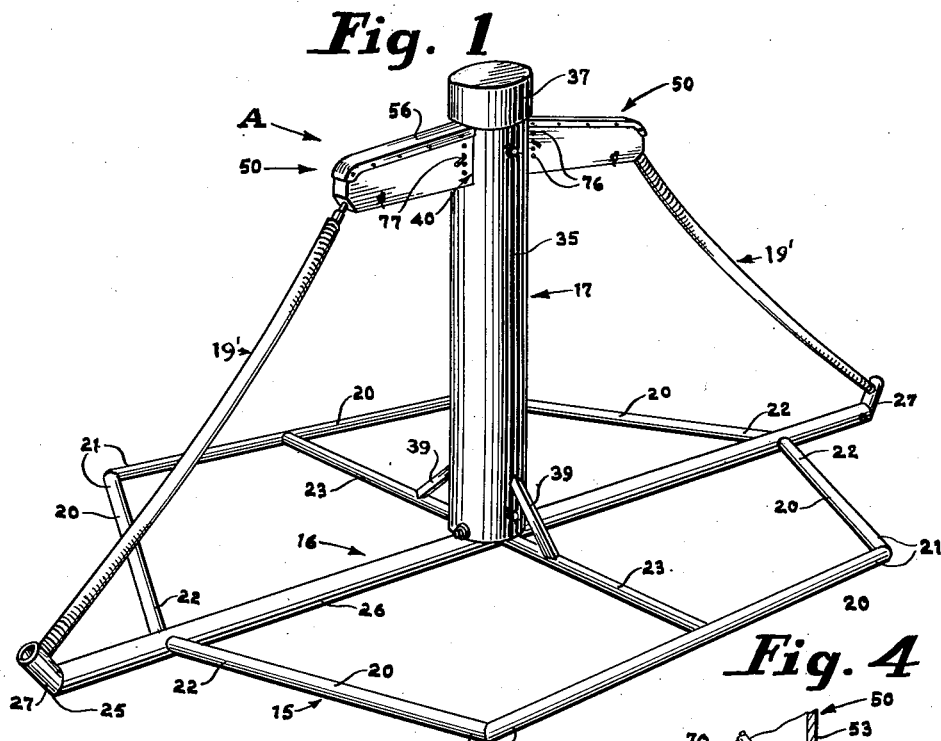
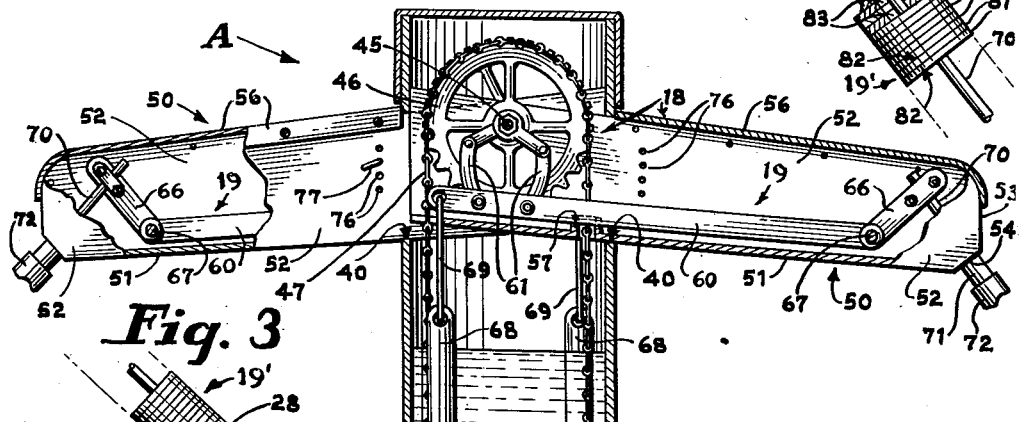
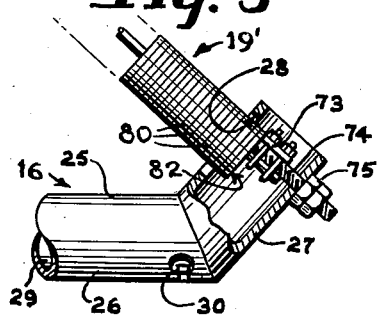
INVENTOR.
WILLIAM M. KIRK
BY *Lancaster, Allwine & Rommel*
ATTORNEYS.

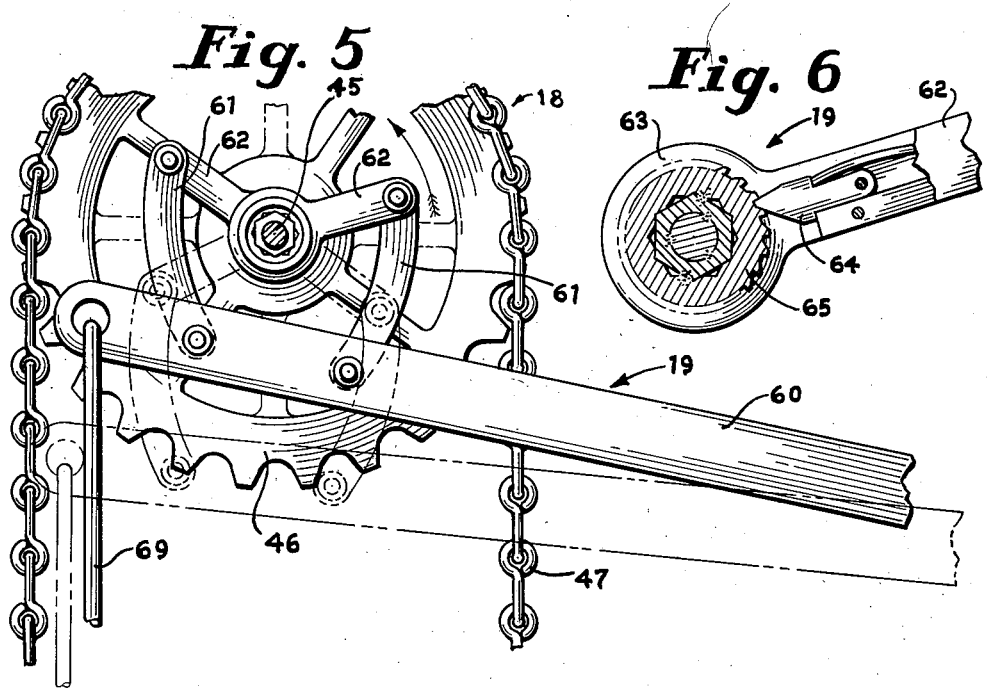
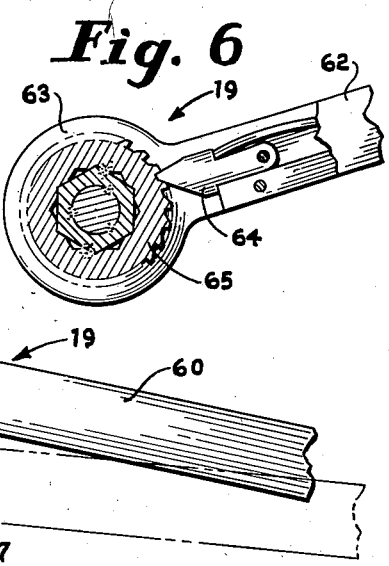
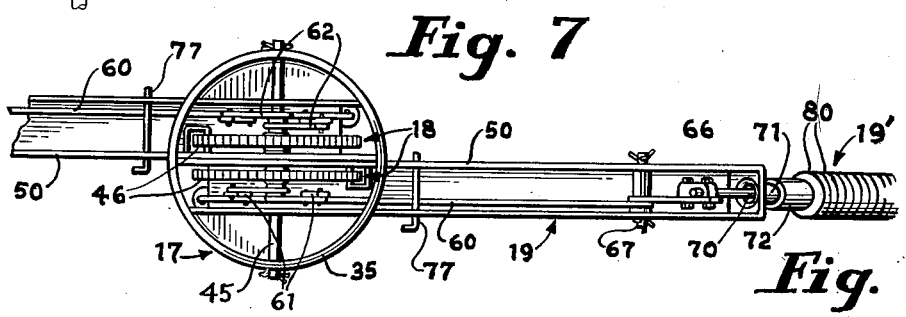
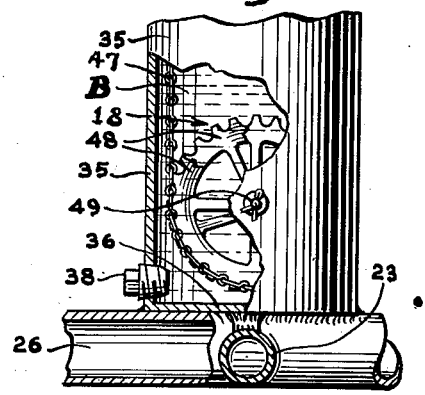
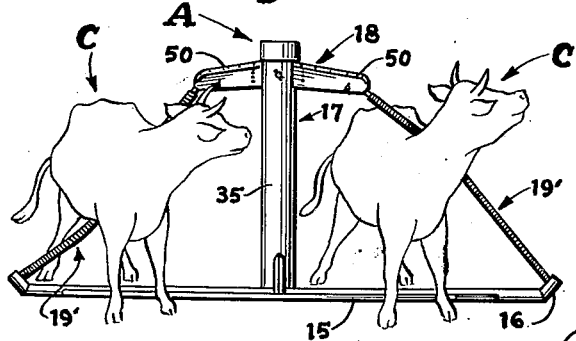

Patented Jan. 1, 1952

2,581,028

UNITED STATES PATENT OFFICE 2,581,028

ANIMAL RUBBING AND OILING STATION OR APPARATUS

William M. Kirk, Amarillo, Tex.

Application April 24, 1950, Serial No. 157,767

19 Claims. (Cl. 119—157)

This invention relates to means for rubbing the skin, hide, hair, bristles or fur of animals, the rubbing being accomplished by the animals themselves. Additionally, the rubbing may daub, coat or impregnate the rubbed portions of the animal with a suitable medium, such as oil or insecticide, or both.

An important object of the invention is to provide a station or apparatus which may be set up in a suitable location so that animals may rub against or upon a portion or portions of the apparatus, with the portion or portions being so constructed that they will conform to the contour of the body surface to be rubbed even the lower surface of the abdomen. Furthermore, the station or apparatus is such that large, small or medium-sized animals may use it with equal facility.

Another important object is to provide apparatus wherein the rubbing portion or portions include a plurality of rigid abrasive-resistant members carried along a suitable flexible member, whereby the outer surfaces of the abrasive-resistant members will be contacted by the animal's body but the flexible members will not be so contacted, thus preventing wear upon, damage to or destruction of the latter.

A further important object is to provide an apparatus which will be operated by the animals rubbing against the portions mentioned so that, if desired, a suitable volume of a selected liquid medium will be conveyed to the portions and will travel along the portions and be retained thereon, to be transferred to the animal's body during this rubbing. Such a medium may be an insecticide in an oily vehicle.

The construction of the apparatus is such that the medium will not have a steady uninterrupted travel to the portions mentioned but the extent of its travel thereto will be controlled by the extent to which the portions are rubbed by the animals. Consequently there will not be flooding of the portions by, for example, an oil-and-insecticide medium. Such flooding is undesirable for a number of reasons during intervals, for example, when the apparatus is not in use for extended periods.

Additionally, an important object is to provide an apparatus for the purpose last described, which apparatus, in effect, oils itself, whereby there is but little wear on moving parts and in this connection, there is no pump, orifice nor jet tube in the apparatus. Pumps and valves are inclined to freeze in mechanical so-called hog-oilers and orifices and jet tubes are a source of trouble since they readily clog up with the cheap grades of oil quite generally employed.

A further important object is to provide an apparatus as described which may be manufactured at low cost and the servicing of which is simple, with the liquid medium supply, such as oil and insecticide, protected from the elements, and the like.

Other objects and advantages of the invention will be apparent during the course of the following detailed description of the invention, taken in connection with the accompanying drawings, forming parts of this specification, and in which drawings:

Fig. 1 is a perspective of the new station or apparatus.

Fig. 2 is a view, mostly in vertical section, of the liquid medium feed portion of the apparatus and on a scale larger than that of Fig. 1.

Fig. 3 is a view, partly in vertical section of the terminal section of a combined liquid drain and support and one terminal section of a rubbing portion of the new apparatus.

Fig. 4 is a view, mostly in vertical section of the opposite, or upper terminal section of the rubbing portion and of a portion of the liquid medium feed means of the new apparatus.

Fig. 5 is a detail, fragmentary, elevational view, of portions of means for causing operation of the liquid medium feed means.

Fig. 6 is a detail view partly in section and partly in elevation, of a pawl and ratchet portion of the means of Fig. 5.

Fig. 7 is a top plan view of the means of Fig. 5 and portions of the structure of Figs. 2 and 4, including a reservoir for the liquid medium employed.

Fig. 8 is a view partly in vertical section and partly in elevation of the lower portion of the reservoir.

Fig. 9 is a view in elevation of the new apparatus or station in use and showing more particularly the manner in which the animals may rub or scratch their sides, backs and lower surface of the abdomen.

In the drawings, wherein for the purpose of illustration is shown a preferred embodiment of the invention and wherein similar reference characters designate corresponding parts throughout the several views, A designates the new station or apparatus; B, a liquid medium therein and C animals rubbing against portions of the new apparatus.

The new station or apparatus includes a base 15, a combined liquid drain and support means 16, a combined reservoir and upstanding support 17 extending from the base 15, liquid medium feed means 18, means 19 for causing operation of the means 18, and catenary rubbing elements or portions 19'.

Referring mainy to Fig. 1, the base 15 preferably comprises a plurality of elongated members 20 forming the outermost portion of the base, which members 20 may be rigid pipes or tubes welded or otherwise secured together at their ends 21 to form a polygon such as a hexagon, with an end 22 of four of the members 20 welded or otherwise connected and with a drain reservoir 25 forming part of the means 16. Additionally, brace members 23, as rigid pipes or tubes, may extend from two of the members 20, intermediate their ends, to the central portion of the drain reservoir 25. Consequently, the drain reservoir 25 has the added function of providing a portion of the base 15.

It is desirable to provide a base 15 of considerable area so that the station A will not tip over.

The drain reservoir 25 forms part of the means 16 and may be an elongated, generally straight tube or pipe 26 having opposite, upwardly and outwardly extending end sections 27 shown, for example, in Fig. 3 and each having a rubbing portion terminal-accommodating opening 28 in its wall, facing toward the reservoir and support 17. A suitable drain opening may extend from the exterior of the pipe 26 to its interior or chamber 29 and be closed by a removable plug 30.

The combined reservoir and support 17 is illustrated as an upwardly-extending cylinder 35 having a bottom wall 36 (shown in Fig. 8) and a preferably open upper end, which may be closed by a removable cap 37. Adjacent the bottom wall 36 may be a drain opening, closed by a removable plug 38. The combined reservoir and support is preferably mounted upon the central portion of the base 15 and the bottom wall 36 welded, soldered or otherwise secured thereto and to the central portion of the pipe 26. Suitable braces 39 may extend from the cylinder 35 to the adjacent brace members 23 and be welded thereto. At locations substantially 180° apart preferably the upper portion of the cylinder 35 is longitudinally fabricated to provide slots 40 in order to accommodate portions of the liquid medium feed means 18, next to be described.

In Figs. 2 and 5 to 9 inclusive is illustrated, especially, the liquid medium feed means 18. This means includes a shaft 45 carried by and bridging the wall of the cylinder 35 preferably adjacent the upper end of the latter and with its longitudinal axis normal to the planes of the slots 40. This shaft mounts a pair of wheels 46 (as in Fig. 7), each being freely rotatable thereon and being preferably toothed and carrying a suitable flexible elongated endless, liquid medium-supporting member 47, which may be a chain the links of which are adapted to fit loosely into the spaces between adjacent teeth of the wheel upon which the member 47 is trained. Spaced below the wheels 46 are two idlers 48 (Fig. 8) which are preferably like the wheels 46, and mounted upon a shaft 49 substantially paralleling the shaft 45 and similarily carried adjacent the wall 36. The idlers, of course, also accommodate the flexible members 47 trained thereon and may be toothed like the wheels 46.

The essential feature of the members 47 is that they may be capable of supporting a film, droplets or drops of the liquid medium during the upward movements of the members 47 but, as these members change their course, over the peripheries of the wheels 46 as well as start to descend, the film, droplets or drops will drip or shower, or be shaken from the members 47 and descend to the bottom walls 51 of flow ways 50 to be next described.

Forming parts of the means 18 are a pair of permanently tilted liquid medium flow ways 50. Each is preferably troughlike having a bottom wall 51 and substantially parallel side walls 52 joined thereto, with an end wall 53 joining the side walls, and a wall 54 connecting the end wall and bottom wall in obtuse angular relation with both, as may be seen in Fig. 4, where the wall 54 is provided with an opening 55 for a purpose later described. A suitable removable cover 56 may be provided for each flow way 50 and extending from the end wall 53 to a location along the flow way where the latter enters the cylinder 35 since each flow way is preferably carried, at its inward end portion and preferably adjacent its upper portion, upon the shaft 45, with this inward end portion extending through a slot 40 and preferably snug with the walls of this slot.

Each flow way 50 accommodates a portion of a wheel 46, and its flexible member 47, small openings in the walls 51 being provided for the flexible members 47 to extend therethrough with some slight clearance but insufficient for any decided flow of liquid medium downwardly from the bottom walls 51 through the small openings. If desired, upwardly-extending collars 57 may surround those of these openings through which the members 47 descend.

Means 19 for causing operation of the means 18 (there being two such means 19 in the example shown) includes, for each wheel 46, an elongated oscillating member or lever 60 housed in an associated flow way 50. Each member 60 carries a pair of links 61 with their lower ends pivoted to the member 60 in spaced apart relation and their upper ends pivoted to the outer ends of pawl-carrying rocker arms 62, the arms having ring shaped portions 63 at their inner ends encircling the shaft 45. The arms 62 carry spring-urged, pivoted pawls 64 in a manner well known in the art with their beaks adapted to extend between the teeth of suitable ratchet wheels 65 fixedly mounted upon suitable hubs of the wheels 46. Upon oscillation of either pair of members 60 there will be a step-by-step rotation of the wheel 46 associated therewith. Oscillation of a member 60 is effected through an offset arm or element 66 fixedly secured at its lower end, to a member 60 preferably at the end of the latter removed from the end carrying the links 61, the element 66 being capable of upward and downward movement. The arm or element 66 and member 60 are pivoted as at 67, the fulcrum being carried by the side walls 52 preferably adjacent the openings 55. Preferably at the extremity of each links-carrying end of the member 60 is suspended a weight 68 disposed in the cylinder 35 for the purpose of raising the arm or element 66 to an upper position in its normal condition. The suspension means 69 for the weight 68 may be a wire extending through suitable perforations in the bottom wall 51.

Secured to the other ends of the offsets 66 in any approved way is the upper end of a stout flexible support member 70, which may be a length of wire which extends through the adjacent opening 55 in the wall 54. It is preferred that the diameter of the opening 55 be somewhat greater than the diameter of the member 70 and that a downwardly and outwardly extending collar or nozzle 71 project from the wall 54, surrounding the opening 55. The free end portion of the collar 71 may be exteriorly screw threaded to receive a screw threaded coupling 72 to the outer end of which is secured, as by welding, a suitable closure (to be more fully described subsequently) having a central opening through which the support member 70 extends, the central opening being slightly larger in diameter than the diameter of the member 70. The lower end portion of the support member 70 is secured, for example as shown in Fig. 3, to the nearest end section 27 of the pipe 26. Here this lower end portion is clamped, as by the conventional clamp 73 to a screw threaded stub 74 paralleling axis of this end portion and in contact therewith. The free end of this stub extends through and outwardly of a suitable perforation in the end section 27 and a nut 75 is mounted upon this free end and bears against the outer face of the end section 27. The uppermost end face of the stub 74 forms an abutment, as will be subsequently described.

It is apparent that, with the rubbing elements or portions 19' each normally disposed in the shape of a catenary as shown in Fig. 1, any pressure which will cause either of them to be flexed from such normal catenated condition will cause downward movement of the member 60 and consequent rotation of the wheel 46 operatively connected therewith. Thus, by way of example, an animal rubbing the lower surface of its abdomen, as shown in Fig. 9, upon either rubbing portion 19' will operate the liquid feed means 18 upon downward movement of the upper end portion of the catenated rubbing portion 19' and its associated arm or element 66 from a normal position.

In order to selectively limit the extent of oscillation in one direction of the members 60, I may provide a vertical row of perforations 76 in opposite side walls 52 with a removable bridge or barrier 77, such as a rigid wire, to extend through opposite perforations. When the barrier 77 is in the lowermost perforations 76, the oscillations of the associated member 70 will be stopped.

While the flexible support members 70 form parts of the two means 19, they additionally function as supports for and parts of the rubbing portions 19'.

Preferably the two rubbing portions 19' are made up of a plurality of fluid-medium carrying and supplying members 80. The essentials of these members are that each of them have an outer or side face 81 and two end faces 82 extending therefrom, which faces 82 may be parallel and adapted to normally contact the like faces of adjacent members 80. The faces 81 and 82 may form substantially right angles and there is a suitable perforation 83, preferably axially disposed, through each portion 80. The faces 81 and 82 should be such that the fluid medium will normally slowly flow over the faces by gravity. I have discovered that metallic washers, such as of iron or steel, are suitable for the members 80. I may employ washers of one-half inch internal diameter strung upon a three-eighths inch external diameter flexible member 70. For example with nine hundred and fifty washers strung upon a suitable length of flexible member 70, there is provided faces having a combined area of over three thousand square inches of fluid-medium containing surface. It will be noted, as in Fig. 4 that the perforations 83 are large enough so that the members 80 may tip or cant on their associated flexible member 70. Such movements tend to squeeze the liquid medium B upon the faces 82 outwardly to or adjacent the face 81. Some of the liquid medium B will flow along the flexible members 70 but the movements of the members 80 will tend to scrape this off and it will then flow over the faces 82.

It will be noted in Fig. 4 that the uppermost member 80 forms the closure for the coupling 72 since the former may be welded to the lower mouth of the coupling 72 and thus have two functions.

In Fig. 3 it will be noted that the upper end face of the stub 74 provides an abutment for the lowermost of the members 80 and that the latter is within the end section 27 so that any surplus fluid medium B will drip into the pipe 26.

After the new apparatus is set up, as in a field, the cylinder 35 may be supplied with a suitable fluid medium B which may be spent crank case oil carrying, if desired, an insecticide. The operator may also initially pour a volume of the medium B upon the bottom walls 51 so it will flow along the downwardly extending flow ways 50, then through the opening 55, nozzle 71, coupling 72, along the member 70 and around and over the members 80.

As the animals, such as C in Fig. 9 rub against the catenated rubbing portions 19' they will not only distort them (as upwardly at the right hand portion of this figure, or as downwardly at the left hand portion) but will also cause operation of the means 19 by downward movement of the upper end portion of the rubbing member which will, in turn, cause operation of the means 18 to draw the liquid medium B from the reservoir 17 to continue the flow initially started by the operator.

Distortion of the rubbing portions 19' as in Fig. 9 will cause relative movement of one fluid medium carrying and supplying member 80 with reference to the adjacent members 80 and cause the fluid medium B to pass from between adjacent members 80 outwardly to their outer faces 81 or to the edges of the faces 81 and 82 so that it will be taken up by the animals and be daubed or rubbed upon them.

It will be noted in Fig. 9 that the rubbing portions 19' conform to the contour of the animals and that various areas of their body surfaces may be contacted with the portions 19'.

Obviously, only when the portions 19' are being distorted, will the means 18 operate so there will be no continuous flow of medium B along the portions 19' when the apparatus is not in use. Such flow would be wasteful and continuous operation would quickly deplete the supply of medium B.

If it is desired to employ the apparatus simply as a rubbing device, the operator will insert the bridges or barriers 77 in the lowermost perforation 76, thus preventing movements of the members 60.

Because of the use of washers or washer-like members 80 strung upon the flexible support member 70 there is provided a construction with the components capable of being bodily moved one with respect to another when engaged by the animals, thus providing a rubbing surface superior to rope, cable chain or the like, since there are a plurality of the faces 82 in movable contact with each other tending to squeeze the medium B outwardly to the face 81. Rubbing devices of fabric or similar material capable of being impregnated by a medium, such as the medium B, tend to become gummy or hardened and do not function satisfactorily.

It should be noted that I have not employed springs, valves or like moving parts apt to become inoperative or clogged by the more or less viscous medium B, nor parts apt to freeze in cold weather.

While I prefer to employ metallic (iron or steel) washers for the members 80, it should be noted that they will not tend to rust since they will be coated with the oily vehicle of the medium B.

Various changes may be made to the form of the invention herein shown and described without departing from the spirit of the invention or scope of the claims.

What is claimed is:

1. In an animal rubbing and oiling station, a horizontally-disposed base having an outermost portion; a support extending upwardly from said base and having an upper end; a catenated rubbing and oiling portion, including an elongated loosely flexible member extending from adjacent said outermost portion of said base upwardly to adjacent the upper end of said support, and a plurality of perforated members strung along said elongated member, each perforated member having an oil-film receiving outer face and opposite oil film-receiving end faces; and means for flowing oil onto said elongated member.

2. In an animal rubbing and oiling station, a horizontally-disposed base having an outermost portion; combined support and oil drainage means, including a conduit extending across said base to said outermost portion and secured thereto; a support extending upwardly from said base and having an upper end; a rubbing and oiling portion, including an elongated flexible member extending from adjacent said outermost portion of said base upwardly to adjacent the upper end of said support, and a plurality of perforated members strung along said elongated member, each perforated member having an oil-film receiving outer face and opposite oil film-receiving end faces, the lower end of said elongated member extending into said conduit; and means for flowing oil onto said elongated member.

3. In an animal rubbing and oiling station, a horizontally-disposed base having an outermost portion; combined support and oil drainage means, including a conduit extending across said base to said outermost portion and secured thereto; a support extending upwardly from said base and having an upper end; a rubbing and oiling portion, including an elongated flexible member extending from adjacent said outermost portion of said base upwardly to adjacent the upper end of said support, and a plurality of perforated members strung along said elongated member, each perforated member having an oil-film receiving outer face and opposite oil film-receiving end faces, the lower end of said elongated member and the lowermost of said perforated members extending into said conduit; and means for flowing oil onto said flexible member.

4. In an animal rubbing and oiling station, a horizontally-disposed base having an outermost portion; a support extending upwardly from said base and having an upper end; a catenated rubbing and oiling portion, including an elongated loosely flexible member extending from adjacent said outermost portion of said base upwardly to adjacent the upper end of said support, and a plurality of perforated members strung along said elongated member, each perforated member having an oil-film member having an oil-film receiving outer face and opposite oil film-receiving end faces, each of said perforated members comprising a washer; and means for flowing oil onto said flexible member.

5. In an animal rubbing and oiling station, a horizontally-disposed base having an outermost portion; a support extending upwardly from said base and having an upper end; a catenated rubbing and oiling portion, including an elongated loosely flexible member extending from adjacent said outermost portion of said base upwardly to adjacent the upper end of said support, and a plurality of perforated members strung along said elongated member, each perforated member having an oil-film receiving outer face and opposite oil film-receiving said faces, each of said perforated members comprising a metallic washer; and means for flowing oil onto said flexible member.

6. In an animal rubbing and oiling station, a horizontally-disposed base having an outermost portion; a rigid support extending upwardly from said base and having an upper end; a rubbing and oiling portion, including an elongated flexible member extending from adjacent said upper end downwardly and outwardly to adjacent said outermost portion, and a plurality of perforated members strung along said flexible member, each having an outer oil film-receiving face and opposite oil film-receiving end faces, and a perforation extending from one face to the other end face, with a portion only of the wall of each of said perforations in contact with said flexible member and said perforated members being normally in end face contact, one with another; and means for flowing oil to the upper end of said flexible member.

7. In an animal rubbing and oiling station, a horizontally-disposed base having an outermost portion; an oil reservoir constituting a rigid support extending upwardly from said base and having an upper end; a catenated rubbing and oiling member extending from adjacent said upper end downwardly and outwardly to adjacent said outermost portion, means securing said rubbing and oiling member at adjacent said outermost portion; means for conducting oil to said rubbing and oiling member including a flow way extending, from adjacent said upper end, outwardly and downwardly and having an outlet at its lowermost end with the upper end of said rubbing and oiling member extending into said outlet, and means to discharge oil from said reservoir into said flow way at the uppermost end of the flow away.

8. In an animal rubbing and oiling station, a horizontally-disposed base having an outermost portion; a rigid support extending upwardly from said base and having an upper end and an oil reservoir; a catenated rubbing and oiling member extending from adjacent said upper end downwardly and outwardly to adjacent said outermost portion, means securing said rubbing and oiling member at adjacent said outermost portion; means for conducting oil to said rubbing and oiling member including a flow way extending, from adjacent said upper end, outwardly and downwardly and having an outlet at its lowermost end with the upper end of said rubbing and oiling member extending into said outlet and said rubbing and oiling member being capable of flexing whereby the upper end thereof will move downwardly and outwardly; oil discharge means to discharge oil from said reservoir into said flow way at the uppermost end of the flow way including a step-by-step rotating wheel within said flow way, and an oil carrying endless member trained thereover and extending into said reservoir; and means to operate said oil discharge means including a lever, disposed in said flow way, operatively connected with the upper end of said rubbing and oiling member, means operatively connecting said lever with said wheel to rotate said wheel step-by-step upon upward and downward movement of the upper end of said rubbing and oiling member, and means carried by said lever to yieldably resist downward movement of said rubbing and oiling member and draw said rubbing and oiling member upward.

9. In an animal rubbing and oiling station, a horizontally-disposed base having an outermost portion; a rigid support extending upwardly from said base and having an upper end and an oil reservoir; a catenated rubbing and oiling member extending from adjacent said upper end downwardly and outwardly to adjacent said outermost portion; means securing said rubbing and oiling member at adjacent said outermost portion; means for conducting oil to said rubbing and oiling member including a flow way extending, from adjacent said upper end, outwardly and downwardly and having an outlet at its lowermost end with the upper end of said rubbing and oiling member extending into said outlet and said rubbing and oiling member being capable of flexing whereby the upper end thereof will move downwardly and outwardly; oil discharge means to discharge oil from said reservoir into said flow way at the uppermost end of the flow way including a step-by-step rotating wheel within said flow way, and an oil carrying endless member trained thereover and extending into said reservoir, and means to operate said oil discharge means including a lever, disposed in said flow way, operatively connected with the upper end of said rubbing and oiling member, means operatively connecting said lever with the upper end of said rubbing and oiling member, means operatively connecting said lever with said wheel to rotate said wheel step-by-step upon upward and downward movement of the upper end of said rubbing and oiling member, means carried by said lever to yieldably resist downward movement of said rubbing and oiling member and draw said rubbing and oiling member upward; and means to releasably prevent movement of said lever.

10. In an animal rubbing and oiling station, a horizontally-disposed base having an outermost portion; a rigid support extending upwardly from said base and having an upper end and an oil reservoir; a catenated rubbing and oiling member extending from adjacent said upper end downwardly and outwardly to adjacent said outermost portion; means securing said rubbing and oiling member at adjacent said outermost portion; means for conducting oil to said rubbing and oiling member including a flow way extending, from adjacent said upper end, outwardly and downwardly and having an outlet at its lowermost end with the upper end of said rubbing and oiling member extending into said outlet and said rubbing and oiling member being capable of flexing whereby the upper end thereof will move downwardly and outwardly; oil discharge means to discharge oil from said reservoir into said flow way at the uppermost end of the flow way including a step-by-step rotating wheel within said flow way, and an oil carrying endless member trained thereover and extending into said reservoir, and means to operate said oil discharge means including a lever, disposed in said flow way, operatively connected with the upper end of said rubbing and oiling member, means operatively connecting said lever with the upper end of said rubbing and oiling member, means operatively connecting said lever with said wheel to rotate said wheel step-by-step upon upward and downward movement of the upper end of said rubbing and oiling member, means carried by said lever to yieldably resist downward movement of said rubbing and oiling member and draw said rubbing and oiling member upward; and means to releasably prevent movement of said lever including a removable barrier carried by said flow way and extending across the path of travel of said lever.

11. In an animal rubbing station, a horizontally-extending base having an outermost portion; a support extending upwardly from said base and having an upper end; and a catenated rubbing portion including an elongated flexible member extending from adjacent the upper end of said support outwardly and downwardly therefrom to adjacent said outermost portion of said base, with a plurality of perforated members, having exposed rubbing surfaces strung loosely upon said elongated member.

12. In an animal rubbing station, a horizontally-extending base having an outermost portion; a support extending upwardly from said base and having an upper end; and a catenated rubbing portion including an elongated flexible member extending from adjacent the upper end of said support outwardly and downwardly therefrom to adjacent said outermost portion of said base, with a plurality of perforated members, comprising washers, having exposed rubbing surfaces, strung loosely upon said elongated member.

13. In an animal rubbing station, a horizontally-extending base having an outermost portion; a support extending upwardly from said base and having an upper end; and a catenated rubbing portion including an elongated flexible member extending from adjacent the upper end of said support outwardly and downwardly therefrom to adjacent said outermost portion of said base, with a plurality of perforated members, comprising metallic washers, having exposed rubbing surfaces strung loosely upon said elongated member.

14. In an animal rubbing and oiling station, combined support and oil drainage means, including an elongated horizontally disposed oil drainage conduit having an opening; a combined support and oil reservoir extending upwardly from and secured to said conduit, and having an upper end; oil feeding means, including an oil flow way opening into said oil reservoir and having an inner end and an outer end with said outer end lowermost and provided with an opening; a rubbing and oiling portion, including an elongated slender member, extending downwardly and outwardly of said support and oil reservoir and having an oil-carrying periphery, and a plurality of washers, having oil-carrying surfaces, strung loosely upon said elongated slender member, the perforations of each of said washers being appreciably greater in diameter than the diameter of said elongated slender member; means securing the lower end of said elongated slender member to said conduit, with the terminal of said elongated slender member extending into said first-named opening; means limiting movement of said washers downwardly to a point adjacent said first-named opening; means limiting upward movement of said washers to a point outwardly of said second-named opening and providing an oil cup including a coupling operatively connected with said flow way at said second-named opening, said coupling having a side wall provided with a lower edge, and means securing the uppermost washer to said lower edge; the upper end of said elongated slender member being within said flow way and in the path of the flow of oil along said flow way.

15. In an animal rubbing and oiling station, a base support means, a support and oil reservoir mounted on said base support and extending upwardly therefrom, oil feeding means in the support and reservoir, an oil flow way extending laterally downwardly from the upper part of said support and reservoir and communicating therewith for receiving oil therefrom when said oil feeding means is operated, said flow way having an opening in its lower outer end, operating means connected with said oil feeding means above said flow way, and a catenated rubbing member for conducting oil from said flow way having its upper end extending through said opening in the flow way and connected with said operating means for the oil feeding means and its lower end connected with said base support means beyond the support and reservoir whereby distortion of the catenated rubbing member between its ends will actuate said operating means and effect the operation of the oil feeding means.

16. In an animal rubbing and oiling station, a base support means, a support and oil reservoir mounted on said base support and extending upwardly therefrom, oil feeding means in the support and reservoir, an oil flow way extending laterally downwardly from the upper part of said support and reservoir and communicating therewith for receiving oil therefrom when said oil feeding means is operated, said flow way having an opening in its lower outer end with a cylindrical nipple attached to the flow way surrounding the opening and extending downwardly therefrom, operating means connected with said oil feeding means above said flow way, a catenated elongated member for conducting oil from said flow way having its upper end extending through said nipple and opening in the flow way and connected with said operating means for the oil feeding means and its lower end connected with said base support means beyond the support and reservoir whereby distortion of the elongated member between its ends will actuate said operating means and effect the operation of the oil feeding means, said elongated member having rubbing means encircling the same between its connection with the base support and said nipple extending from the flow way, and the upper end of said rubbing means having a cylindrical collar integrally secured thereto and telescopically engaging said nipple extending from the flow way.

17. In an animal rubbing and oiling station the combination of an upstanding rigid support including an oil supply reservoir, a loosely flexible, elongated rubbing element, means including an upwardly and downwardly movable element in said support to supply oil from the reservoir to the upper end of said rubbing element upon downward movement of said movable element, means connecting the upper end of said rubbing element to said upwardly and downwardly movable element, means fixing the lower end of said rubbing element against movement, and means for yieldably raising said upwardly and downwardly movable element to an upper position and disposing said rubbing element in the shape of a catenary, in their normal conditions, whereby gravity flow of the oil along the rubbing element will occur upon downward movement of the upper end portion of the rubbing element and said upwardly and downwardly movable element, incident to an animal distorting the rubbing element from its normal condition by rubbing engagement therewith, at any position with respect thereto.

18. In an animal rubbing and oiling station the combination of an upstanding rigid support including an oil supply reservoir, a loosely flexible elongated, rubbing element, means including an upwardly and downwardly movable element in said support to supply oil from the reservoir to the upper end of said rubbing element upon downward movement of said movable element, means connecting the upper end of said rubbing element to said upwardly and downwardly movable element, means fixing the lower end of said rubbing element against movement, means for yieldably raising said upwardly and downwardly movable element to an upper position and disposing said rubbing element in the shape of a catenary, in their normal conditions, and means for adjusting the extent of movement of said upwardly and downwardly movable element whereby gravity flow of the oil in a regulated quantity responsive to the adjustment of said adjusting means along the rubbing element will occur upon downward movement of the upper end portion of the rubbing element and said upwardly and downwardly movable element, incident to an animal distorting the rubbing element from its normal condition by rubbing engagement therewith, at any position with respect thereto.

19. In an animal rubbing and oiling station the combination of an upstanding rigid support including an oil supply reservoir, a loosely flexible, elongated rubbing element, means including an upwardly and downwardly movable element in said support to supply oil from the reservoir to the upper end of said rubbing element upon downward movement of said movable element said support having a cylindrical nipple serving as a flow way for oil to the rubbing element, means connecting the upper end of said rubbing element through said nipple to said upwardly and downwardly movable element, means fixing the lower end of said rubbing element against movement, and means for yieldably raising said upwardly and downwardly movable element to an upper position and disposing said rubbing element in the shape of a catenary, in their normal conditions, whereby gravity flow of the oil along the rubbing element will occur upon downward movement of the upper end portion of the rubbing element and said upwardly and downwardly movable element, incident to an animal distorting the rubbing element from its normal condition by rubbing engagement therewith, at any position with respect thereto.

WILLIAM M. KIRK.

REFERENCES CITED

The following references are of record in the file of this patent:

UNITED STATES PATENTS

| Number | Name | Date |
|---|---|---|
| 367,075 | Todd | July 26, 1887 |
| 745,016 | Huncker | Nov. 24, 1903 |
| 1,050,712 | Applegate | Jan. 14, 1913 |
| 1,195,458 | Giesenhaus | Aug. 22, 1916 |
| 1,219,352 | Schepp | Mar. 13, 1917 |
| 1,238,093 | Bloomer | Aug. 28, 1917 |
| 1,241,495 | Children | Oct. 2, 1917 |
| 1,291,367 | Barhite | Jan. 14, 1919 |
| 1,314,274 | Larkin | Aug. 26, 1919 |
| 1,315,583 | Starbuck | Sept. 9, 1919 |
| 1,327,088 | Curttright | Jan. 6, 1920 |
| 2,062,098 | MacChesney | Nov. 24, 1936 |
| 2,416,123 | Siemen | Feb. 18, 1947 |
| 2,438,731 | Wedeking | Mar. 30, 1948 |
| 2,456,197 | Jensen | Dec. 14, 1948 |